Oct. 20, 1959 K. SCHLESINGER 2,909,594

COLOR TELEVISION RECEIVER WITH CHROMA PHASE-SHIFTING MEANS

Filed April 12, 1955 2 Sheets-Sheet 1

INVENTOR.
Kurt Schlesinger
BY
Mueller & Aichele
Attys.

COLOR TELEVISION RECEIVER WITH CHROMA PHASE-SHIFTING MEANS

Filed April 12, 1955 2 Sheets-Sheet 2

INVENTOR.
Kurt Schlesinger
BY
Mueller & Aichele
Attys.

2,909,594
Patented Oct. 20, 1959

2,909,594

COLOR TELEVISION RECEIVER WITH CHROMA PHASE-SHIFTING MEANS

Kurt Schlesinger, La Grange, Ill., assignor to Motorola, Inc., Chicago, Ill., a corporation of Illinois Application April 12, 1955, Serial No. 500,768

10 Claims. (Cl. 178—5.4)

The present invention relates to color television receivers and more particularly to an improved color television receiver for utilizing present-day standardized NTSC color television signals.

In order to achieve compatibility with existing monochrome television receivers, the Federal Communications Commission has standardized a color television signal for color television. This signal includes a luminance component containing sufficient monochrome information for black-and-white reproduction, and the signal also includes chrominance components containing additional information for color reproduction.

The NTSC color television signal is formed at the transmitter by deriving separate color video signals from a series of suitable picture converting means, each video signal corresponding to one particular primary color of the object to be televised. The color video signals are combined in selected proportions to constitute the luminance signal component (Y) of the color television signal, and this component is combined with line and field synchronizing pulses to form a composite signal which is amplitude modulated on the television carrier wave.

The color video signals are further mixed with the luminance component to form a series of color-difference signals each bearing distinct chroma information. These color-difference signals are amplitude modulated at different phase angles on a chroma subcarrier; and the modulated carrier is, itself, amplitude modulated on the television carrier wave. For example, a blue $(B-Y)$ color-difference signal and a red $(R-Y)$ color-difference signal are modulated on the chroma subcarrier in phase quadrature, and a green $(G-Y)$ color-difference signal is effectively modulated on the subcarrier at a phase angle of 125° to the $(B-Y)$ color-difference signal. As is well known, the $(G-Y)$ color-difference signal can be reconstituted at the receiver from the other two color-difference signals and is not actually transmitted. The color television signal also includes bursts of a reference signal, which reference signal has the same frequency as the chroma subcarrier and is in phase opposition with the $(B-Y)$ color-difference signal. These bursts are impressed upon successive line blanking pulses in the color television signal immediately following the respective line synchronizing pulses pedestaled on the blanking pulses.

It is usual in color television receivers, constructed to utilize the color television signal discussed above, to provide a luminance channel in which the luminance signal is selected and amplified, and also to provide a chrominance channel in which the chroma subcarrier is demodulated to recover the $(R-Y)$ and $(B-Y)$ color-difference signals. These color-difference signals are matrixed in prior art receivers to attain the $(G-Y)$ color-difference signals, and the three color-difference signals are usually mixed with the luminance (Y) signal within the color reproducer to derive the blue, green and red color signals for color reproduction.

The color demodulators in the chrominance channel of the receiver respond to a reference signal generated in the receiver and phased with the color bursts of reference signals, to produce in each instance the modulation of the chroma subcarrier that is in phase (or in phase opposition) with the reference signal in a particular demodulator. In prior art receivers, the chroma subcarrier is usually applied to a red and to a blue demodulator, and the reference signal is applied directly to the latter and through a phase-quadrature network to the former, to enable the demodulators to develop respectively the $(R-Y)$ and $(B-Y)$ color-difference signals.

Patent No. 2,885,467, which issued May 5, 1959 to the present inventor, and which is assigned to the present assignee, discloses and claims various types of chroma demodulators for recovering the chroma information from the chroma subcarrier. Among these was a grid-controlled demodulator using a triode and which offered a high degree of linearity and adequate color fidelity as well as high gain. Copending application Serial No. 731,576, filed April 22, 1958, which is a continuation of application Serial No. 451,344 filed August 23, 1954, now abandoned, in the name of the present inventor and also assigned to the present assignee discloses and claims a system which utilizes the combination of grid-controlled demodulators such as disclosed in the first-mentioned application with a delayed chroma subcarrier input and a synchronous reference signal cathode drive to the different demodulators. For the delay of the chroma subcarrier, a color memory or delay line was used which in one embodiment consisted of a low impedance delay line of critical electrical length. This delay line formed an efficient drive for the grid-controlled detector so as to provide an improved and most acceptable color decoder. However, this line was somewhat inflexible due to the difficulties in providing continuous manual adjustment thereof.

It is an object of the present invention to provide an improved color television receiver of the general type disclosed in the last-mentioned application and which includes improved and highly stable means for feeding the chroma subcarrier to the color demodulators with selected phases to recover the color components modulated thereon, and which phases are manually adjustable in a continuous manner through selected ranges.

A general object of the invention is to provide an improved color television receiver which is constructed to be readily adjustable yet stable in its operation, and which uses relatively simple circuitry and relatively few components so as to be economical in its construction.

A feature of the invention is the provision of an improved color television receiver which includes a manually adjustable resistance-capacitance phase shifting network that functions as a low impedance source to feed the chroma subcarrier to the various chroma demodulators, and in which the reference signal is applied with like phase to all the demodulators; so that the varying load of the demodulators on the subcarrier and reference signal sources does not affect the recovery of the color components to any noticeable extent.

Another feature of the invention is the provision of such an improved color receiver which includes circuits for limiting the reference signal in an instantaneous manner to remove any noise disturbances therefrom and to enable simple unbalanced chroma demodulators to be used without impairing color reproduction.

The above and other features of the invention which are believed to be new are set forth with particularity in the appended claims. The invention itself, however, together with further objects and advantages thereof may best be understood by reference to the following description when taken in conjunction with the accompanying drawings in which:

The invention provides a color television receiver for utilizing a color television signal which includes a chroma or chrominance subcarrier, the subcarrier having a selected frequency and having a plurality of different color components modulated thereon with selected phase relations with respect to one another. The receiver includes a detector circuit for demodulating a received color television signal of the type described above, and a chrominance channel is coupled to the detector for selecting and translating the chrominance subcarrier. A plurality of chroma demodulators are included in the chrominance channel. Means is provided for impressing a reference signal on the chroma demodulators which has the frequency of the chrominance subcarrier and which also has a selected phase relation with the color components modulated thereon. Circuit means is also provided for impressing the chroma subcarrier on one of the demodulators to recover one of the color components modulated on the subcarrier, and a resistance-capacity phase-shifting network is provided for impressing the chrominance subcarrier on another of the chroma demodulators to recover another of the color components modulated on the subcarrier.

Figure 1:
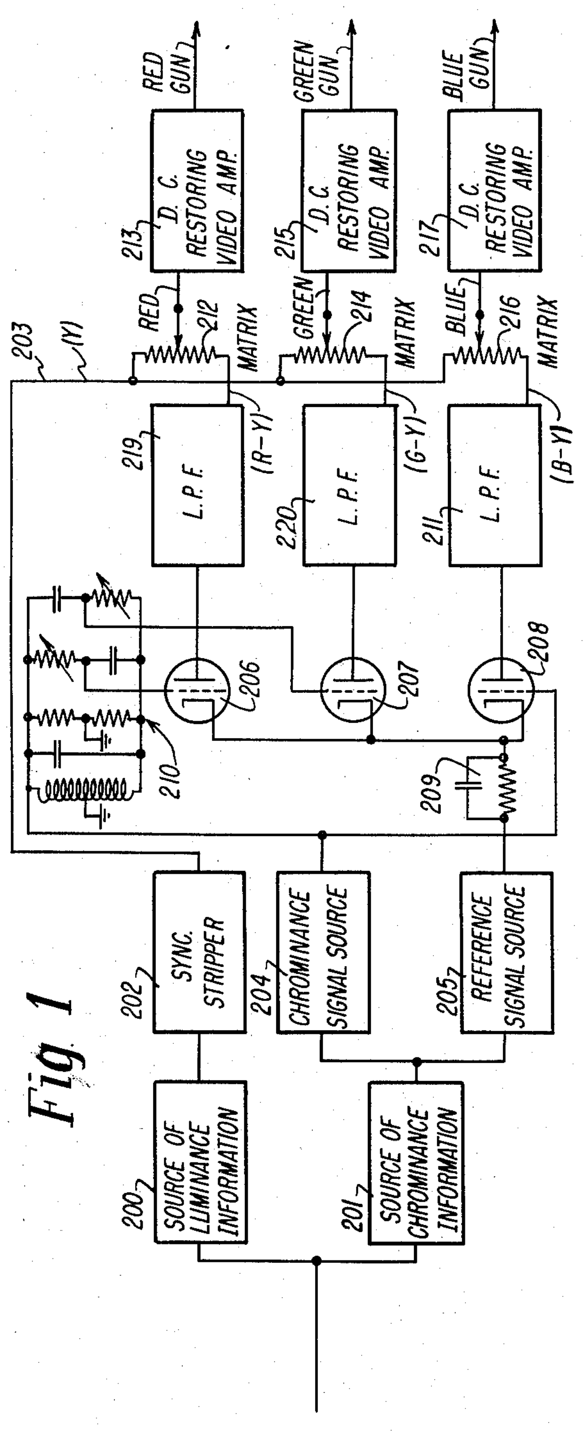
Fig. 1 is a schematic representation of the invention.

In the system of Fig. 1, a color television signal composed of the previously described components is impressed on a source of luminance information 200 and a source of chrominance information 201. Source 200 produces the usual monochrome (Y) composite video signal having video frequency components and synchronizing and blanking components. This signal is passed through a synchronizing signal stripper 202 which removes the synchronizing component and leaves the video frequency and blanking components. The stripped signal, which is designated as "Y" then appears on lead 203.

Source 201, on the other hand, produces the chrominance information which is impressed on a chominance signal source 204 and this source produces the usual chrominance subcarrier which is phase and amplitude modulated by the color difference signals as noted previously. The information from source 201 is also impressed on source 205 and the latter source produces the reference signal which, as previously mentioned, has the frequency of the chroma subcarrier and is in phase opposition with the $(B-Y)$ color difference signal.

The reference signal from source 205 is impressed on the cathodes of triode devices 206, 207, 208 through a biasing network 209. The biasing network biases all the triodes to a point where plate rectification occurs for demodulation of the chroma subcarrier in the manner described in the aforementioned copending application 372,697. It is important that the bias produced by network 209 is such that grid current flow is prevented since such flow has an adverse effect on the system. With the disclosed arrangement, the triodes 206, 207, 208 are power driven from their cathodes, and the unmodulated reference signals are impressed thereon directly. This permits the use of selective circuits for driving the grids of the triodes by precisely phased modulated signals, without undue loading of such circuits which would produce phase discrepancies and the like.

The chrominance subcarrier of source 204 is impressed on a resistance-capacity-capacity-resistance phase-shifting network 210 which will be described in detail hereinafter. This permits the chrominance subcarrier to be impressed directly on triode 208, with a selected phase lag on triode 206 and with a selected phase lead on triode 207.

The phasing between the chroma subcarrier and the reference signal in the various triodes is such that each triode recovers a different color-difference signal. The $(R-Y)$ color-difference signal is recovered from the output of triode 206 after it has passed through a low-pass filter 219. The $(G-Y)$ color-difference signal is derived from the output from triode 207 after it has passed through a low-pass filter 220. The $(B-Y)$ color-difference signal is recovered from the output of triode 208 after it is passed through a low-pass filter 211.

The $(R-Y)$ color-difference signal from filter 219 is matrixed in a matrix 212 with the (Y) signal on lead 203. This produces the red color signal which is impressed on the red gun of the image reproducer through a direct current restoring video amplifier 213. The $(G-Y)$ color-difference signal is matrixed with the (Y) signal in a resistance matrix 214 to produce the green signal, and the green signal is impressed through a direct-current restoring video amplifier 215 on the green gun. Likewise, the $(B-Y)$ color-difference signal from filter 211 is matrixed in matrix 216, and the resulting blue signal is supplied through a direct current restoring video amplifier 217 to the blue gun of the image reproducer.

Because sync stripper 202 removes the synchronizing components, the amplifiers 213, 215 and 217 are enabled efficiently to restore the direct current on the black level blanking pulses of the signal impressed thereon. The gain of each of these amplifiers is made individually adjustable, and a proper color setting may be achieved merely by setting the gains of these amplifiers to provide a proper black and white image on the color reproducer upon the reception of a monochrome television signal.

A convenient color adjustment may be made by varying the resistors in the phase shifting network 210 until the proper phases are obtained. As previously noted, it is important that biasing network 209 bias devices 206, 207, 208 sufficiently so that color demodulation is obtained by plate rectification and no grid current flows. When this is achieved, efficient operation is assured because there is then no appreciable loading on the network 210 by the triodes to produce spurious phase shifts of the chrominance subcarrier as impressed on the demodulator triodes.

Figure 2:
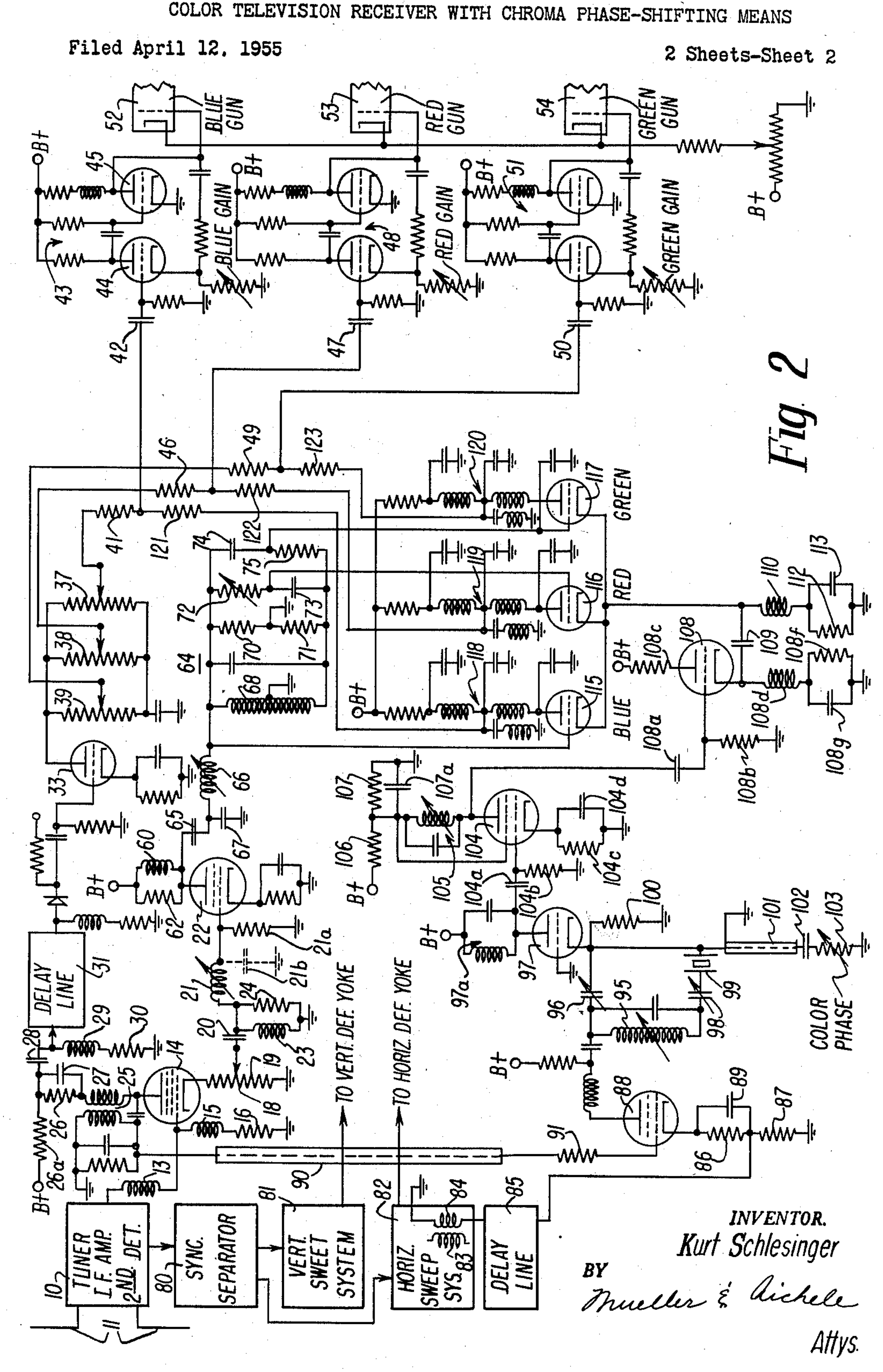
Fig. 2 is a detailed showing of a color television receiver constructed in accordance with the invention.

The color television receiver illustrated in Fig. 2 includes a unit 10 having input terminals connected to an antenna 11. The unit 10 includes the usual tuner, first detector, intermediate frequency amplifier and second detector of the receiver. An output terminal of unit 10 is connected through a series video-frequency peaking coil 13 to the control electrode of a video amplifier electron discharge device 14, the control electrode being returned to a point of reference potential or ground through a parallel peaking coil 15 and resistor 16. The cathode of device 14 is connected through a resistor 18 to the point of reference potential, the resistor 18 having a movable tap 19 thereon to constitute a chroma control and which tap is coupled through a capacitor 20 and winding 23 to ground, winding 23 being shunted by a resistor 24. The junction of capacitor 20 and winding 23 is connected to the control electrode of a band-pass amplifier discharge device 22 through a winding 21, the control electrode being connected to ground through a resistor 21_a_ shunted by the distributed capacity 21_b_ of the input circuit.

The anode of video amplifier discharge device 14 is connected through the primary winding of a transformer 25 and through a pair of series resistors 26, 26_a_ to the positive terminal B+ of a source of unidirectional potential. Resistor 26 is shunted by a capacitor 27, and the junction of resistors 26, 26_a_ is connected to ground through a series-connected capacitor 28, inductance coil 29 and resistor 30. The junction of elements 28 and 29 is connected through a delay line 31 and through a rectifier 32 and capacitor 32_c_ to the control grid of an electron discharge device 33 which is connected to constitute an amplifier for the luminance component of a received color television signal. The input electrode of rectifier 32 is connected to ground through an inductance coil 32*a* and a resistor 32*b*. The output electrode of rectifier 32 is connected to B+ through a resistor 32*e*. The control grid of device 33 is connected to ground through a resistor 32*d*. The cathode of device 33 is connected through a resistor 35 to ground, the resistor being shunted by a capacitor 36.

The anode of device 33 is connected to a matrix composed of three potentiometers 37, 38 and 39 connected at one end to the anode and by-passed to ground at the other end through a by-passing capacitor 40. Potentiometer 37 has a movable tap thereon which is connected through a resistor 41 and a capacitor 42 to a two-stage D.C. restoring amplifier 43. Amplifier 43 includes a pair of discharge devices 44, 45 connected in a similar manner to the connection of the amplifier disclosed in the copending application 451,344 referred to previously. That is, these devices are coupled together for degenerative feedback operation so as to render the amplifier 43 highly linear and independent of tube and power supply variations. Also, the amplifier has a high gain and may be efficiently driven by the high impedance matrix 37. The control electrode of device 44 is driven positive by the blanking components of the luminance signal so that the device functions as a direct-current restorer.

The movable tap on potentiometer 38 is connected through a resistor 46 and capacitor 47 to an amplifier 48 which may be similar to the amplifier 43 described above. Likewise, the movable tap on potentiometer 39 is connected through a resistor 49 and capacitor 50 to an amplifier 51 which, likewise, may be similar to the amplifier 43. Amplifier 43 is connected to the input electrodes of the blue gun 52 of the receiver color image reproducer, and amplifiers 48 and 51 are connected respectively to the red gun 53 and to the green gun 54 of the reproducer.

The anode of band-pass amplifier discharge device 22 is connected to the positive terminal B+ through an inductance coil 60 shunted by a resistor 62, and the anode is further coupled to the balanced input circuit of a phase-shifting network 64 through a capacitor 65 and a variable inductance coil 66, the junction of elements 65 and 66 being by-passed to ground through a capacitor 67. The balanced input circuit of network 64 is composed of a bifiler winding 68 shunted by a capacitor 69 to form a resonant network tuned to the frequency of the chroma subcarrier. The resonant network is heavily damped by a pair of equal value resistors 70, 71; and the common junction of these resistors together with the mid-point of bifiler winding 68 are connected to ground. The variable inductance coil 66 is connected to the one end of the bifiler winding. A variable resistor 72 and a series-connected capacitor 73 are connected across the input circuit in the recited order, and a capacitor 74 and variable resistor 75 are also connected across the input circuit and in the recited order.

The unit 10 has a further output terminal which is connected to a synchronizing signal separator 80 which, in turn, is connected to a usual vertical sweep system 81 and horizontal sweep system 82. The output terminals of the sweep systems are connected respectively to the vertical and horizontal deflection element of the image reproducer.

The horizontal sweep system includes a usual output transformer 83 which is shown schematically and that transformer includes an auxiliary winding 84 having one end connected to ground and its other end connected through a delay line 85 to the common junction of a pair of resistors 86, 87 connecting the cathode of an electron discharge device 88 to ground, resistor 86 being shunted by a capacitor 89. The secondary winding of transformer 25 in the anode circuit of device 14 is tuned to the frequency of the reference signal bursts, as is the primary winding, so as to form a double-tuned coupling network. The ungrounded end of the secondary winding is connected through a shielded lead 90, and through a limiting resistor 91, to the control grid of device 88. Device 88 functions as a gated amplifier, with delay line 85 providing the proper timing for the horizontal pulses derived from winding 84 to gate the color reference bursts from the horizontal blanking pulses.

The anode of device 88 is connected to the positive terminal B+ through a usual load circuit, and the anode also is coupled to a balanced input circuit 95 that is tuned to the frequency of the chroma bursts. One end of the input circuit is coupled through a neutralizing capacitor 96 to the cathode of an electron discharge device 97, and the other end of the input circuit is coupled through a capacitor 98 and a crystal 99 to the cathode, the cathode being connected to ground through a resistor 100. The resistor 100 is shunted by a series-connected capacitor 102 and variable resistor 103 which are connected to the cathode through a shielded lead 101, the resistor serving as a color phase control and mounted preferably on the front panel of the receiver.

The control grid of device 97 is connected to ground and the anode of the device is returned to the positive terminal B+ through a resonant coupling circuit 97*a* tuned to the frequency of the reference signal. The anode of device 97 is coupled through a capacitor 104*a* to the control grid of an amplitude limiter electron discharge device 104, the control grid being connected to ground through a resistor 104*b*. The cathode of device 104 is connected to ground through a resistor 104*c* shunted by a capacitor 104*d*. The anode of the device is connected through a resonant coupling network 105 to the common junction of potentiometer resistors 106, 107 connected between B+ and ground, resistor 107 being shunted by a by-pass capacitor 107*a*. The screen of device 104 is directly connected to this common junction. The anode of device 104 is coupled through a capacitor 108*a* to the control electrode of cathode follower device 108, the control electrode being connected to ground through a resistor 108*b* and the anode being connected to B+ through a resistor 108*c*. The cathode of device 108 is coupled to ground through an inductance coil 108*d* and through a resistor 108*f* shunted by a capacitor 108*g*.

The cathode of device 108 is coupled to the cathodes of three chroma demodulator electron discharge devices 115, 116, 117 through a capacitor 109. The cathodes of these devices are connected to ground through an inductance coil 110 inductively coupled to coil 108*d*, and through a resistor 112 shunted by a capacitor 113. Both coils 108*d* and 110 are tuned by distributed capacity to translate the reference signal with optimum power.

The control grid of device 115 is connected to the junction of variable inductance coil 66 and capacitor 69. The control grid of device 116 is connected to the junction of resistor 72 and capacitor 73 in the phase shifting network 64, and the control grid of device 117 is connected to the common junction of capacitor 74 and resistor 75 in the resistance-capacity phase shifting network 64.

The anode of device 115 is connected to the positive terminal B+ through a constant K low-pass filter network 118, and this anode is also connected through a resistor 121 to the common junction of resistor 41 and capacitor 42. The anode of device 116 is connected through a constant K low-pass filter 119 to the positive terminal B+, and through a resistor 122 to the common junctions of resistor 46 and capacitor 47. The anode of device 117 is connected through a constant K low-pass filter 120 to the positive terminal B+, and through a resistor 123 to the common junction of resistor 49 and capacitor 50.

When a color television signal of the composition discussed previously herein is intercepted by antenna 11, such a signal is amplified and demodulated in unit 10. The demodulated signal is supplied to the video amplifier 14 wherein it is amplified and supplied through delay line 31 to the video amplifier 33 constituting the luminance channel of the receiver. The pass-band characteristics of video amplifier 14 and video amplifier 33 are sufficiently broad so that all the components of the luminance signal are amplified and translated thereby. The demodulated signal is impressed on rectifier 32 with the syncs extending in the negative direction. A positive bias is placed across the rectifier by elements 32*e*, 32*c* and 32*d*, and the charge on capacitor 32*c* varies with the average value of the signal impressed on the rectifier so that the positive bias likewise varies. This enables rectifier 32 to clip the composite video signal impressed thereon at the base of the syncs even though the amplitude of the video signal varies to some extent. The synchronizing pulses are therefore stripped from the composite video signal by the rectifier circuit, and this allows the full range of amplifiers 33, 43, 48 and 51 to be used for the video signal and blanking components and not for the now useless synchronizing components. This stripping also obviates the tendency of the synchronizing components to paralyze the restoration action of the first stage of amplifiers 43, 48 and 51, and enables this restoration to be made on the blanking components which represent the true "black" level of the received television signal.

Band-pass amplifier 22 is designed to have a pass band of from 2.5–4 megacycles so that it selects the modulated chroma subcarrier to the exclusion of the luminance components of the received color television signal. This amplifier is coupled to the cathode of device 14 through windings 21, 23 which are connected as a transformer to increase the amplitude of the chroma subcarrier supplied to device 22 without phase reversal. The primary winding 23 of the transformer is tuned by the capacitor 20 and distributed capacity to the frequency of this subcarrier, and the secondary winding 21, 23 is tuned to this frequency by capacity 21*b*. The amplified chroma subcarrier from amplifier 22 is impressed on the resistance-capacity-capacity-resistance phase-shifting network 64 for application to the control grids of the chroma demodulator discharge devices 115, 116 and 117. The arrangement is such that the chroma subcarrier is impressed directly on the control grid of demodulator 115 which will be considered the blue demodulator, and the subcarrier is impressed with selected continuously adjustable phase shifts on the respective control grids of the color demodulator discharge devices 116 and 117 which will be considered respectively the red and green demodulators. These latter phase shifts can be controlled by adjustment of variable resistors 72 and 75. Elements 68 and 69 are tuned to the frequency of the chroma subcarrier to form a balanced input circuit for the R—C—C—R network and which is highly damped by resistors 70, 71. The balanced input circuit of network 64 supplies an in-phase component and a 180°-out-of-phase component of the chroma subcarrier across elements 72, 73 and across elements 74, 75. This provides a vector at the common junction of each pair of such elements whose amplitude remains constant but whose phase varies upon adjustment of resistor 72 or of resistor 75, the vector leading the chroma subcarrier at the junction of elements 72, 73 and lagging the subcarrier at the junction of elements 74, 75. The resistances 70, 71 have a relatively low value (e.g., 470 ohms each) with respect to resistors 72, 75 (e.g., 1,000 ohms each) so as to provide a low impedance source and render adjustments of resistors 72 and 75 independent of one another.

The amplified signal from amplifier 14 is also impressed on the control grid of gated amplifier 88 which, as previously noted, is gated to select the color reference bursts. These bursts actuate the circuit of crystal 99 to produce a continuous reference signal having the frequency of the chroma subcarrier. This signal is amplified in grounded grid amplifier 97 and amplitude limited in device 104. The amplitude limited reference signal is then translated through cathode follower 108 to the cathodes of color demodulator devices 115, 116, 117. The reference signal, as so impressed on the color demodulator cathodes, is in phase opposition with the $(B-Y)$ modulation component of the chroma subcarrier. At the same time, the chroma subcarrier is impressed on demodulator 115 directly. Resistor 72 in the phase shifting network 64 is adjusted so that the chroma subcarrier is supplied to the control grid of color demodulator 116 with retarded phase so that the $(R-Y)$ modulation component is in phase opposition to the reference signal. Likewise, resistor 75 is adjusted so that the chroma subcarrier is supplied with advanced phase to the control grid of device 117 so that the synthetic $(G-Y)$ color component is in phase opposition with the reference signal.

Network 112, 113 provides a positive cathode bias for devices 115, 116 and 117, so that the devices may properly perform their demodulating functions in the manner fully described in the copending application 372,697 referred to previously herein. That is, the devices 115, 116 and 117 are biased so that they function as rectifiers for the sum of the chroma subcarrier and reference signal impressed thereon, with the reference signal having an amplitude at least twice that of the chroma subcarrier so that the demodulators perform their demodulating function with a high degree of linearity and chroma fidelity. It is important, as noted previously, that the cathode bias on devices 115, 116, 117 provided by network 110, 111 be sufficient that the devices do not draw grid current so that the phase-shifting characteristics of network 68—75 will not be impaired.

As fully described in copending application Serial Number 372,697 referred to previously herein, it is necessary that the reference signal impressed on the chroma demodulators have an amplitude at least twice that of the chroma subcarrier for the demodulators to operate properly. It is also necessary for the reference signal to have a constant amplitude and be relatively free from noise or else distortions will occur in the detected color-difference signals from the demodulators.

Although, as will be described later, it theoretically should be necessary to limit the peaks of the reference signal of one polarity only since the demodulator devices 115, 116, 117 are driven as rectifiers and only the negative peaks of the reference signal are effective. However, it has been found that tuned coupling circuits such as circuits 105, 108*d*, 110 are desirable for optimum power transfer to the demodulators; and any limiting prior to such tuned circuits must be on both peaks of each cycle of the reference signal. This obtains, since such tuned circuits tend to distribute any noise throughout the signal translated thereby, even if such noise originally appeared only on the peaks of one polarity of that signal. Thus, it is desirable that device 104 function as a "top and bottom" limiter for the reference signal.

It was found that limiting by grid current action was undesirable due to the necessary time constants involved in the grid circuit which produced exaggerated coarse grain interference patterns on the screen of the reproducer. Accordingly, the cathode bias resistor 104*c* was included to prevent the grid from ever going positive, and the screen and plate were connected to a reduced potential point on potentiometer 106, 107 to provide instantaneous top and bottom limiting by plate current cut-off and saturation respectively.

Cathode follower 108 provides sufficient power gain to the amplitude limited reference signal so that adequate drive of the chroma demodulators 115, 116 and 117 may be realized for proper functioning of the demodulators.

Figure 3:
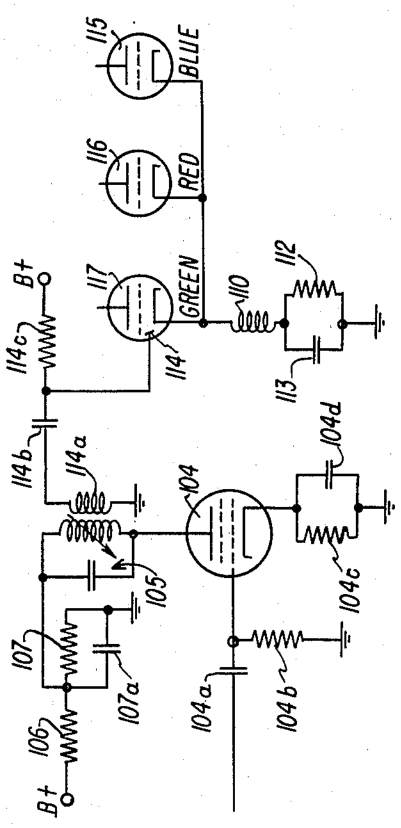
Fig. 3 is a fragmentary showing of a modification of the circuit of Fig. 2.

As noted above, limiting of only one peak of each cycle of the reference signal is necessary if such limiting occurs after any tuned coupling circuits. Such an arrangement is shown in Fig. 3. Here device 104 functions as an amplifier, and the amplified reference signal therefrom is impressed on a limiting diode 114 through an inductive winding 114a coupled to circuit 105 and through capacitor 114b; the anode of diode 114 being connected to B+ through a resistor 114c to establish a threshold potential.

The diode 114 limits only the negative peaks of the reference signal as impressed on devices 115, 116, 117; and, as previously noted, this is all that is necessary. Diode 114 may conveniently be included in the green demodulator device, as shown, or in devices 115 or 116.

The resistance-capacity-capacity-resistance phase-shifting network 68—75 forms a low impedance source for the control electrodes of the chroma demodulators which is required for the efficient drive thereof. The unmodulated reference signal is directly applied with common phase to the cathodes of the demodulators to constitute the power drive therefor, and the varying load exhibited by the cathodes does not adversely affect the chroma demodulation. The resistance-capacity-capacity-resistance network 68—75 is particularly advantageous due to the fact that, in addition to constituting an ideal drive for the demodulators 115, 116, 117, it also enables manual control to be exerted on the chroma phase throughout a continuous range.

The constant K networks 118, 119, 120 in the output circuits of the chroma demodulators pass the color-difference signals with uniform response which is desired for satisfactory color reproduction.

The $(B-Y)$ color-difference signal from device 115 is mixed with the (Y) signal from device 33 across potentiometer 37 to produce the blue video signal which is supplied to amplifier 43. In the same manner, the red video signal is produced at the variable tap on resistor 38, and the green video signal is produced at the variable tap on resistor 39. The variable controls on resistors 37, 38 and 39 (elements 212, 214, 216 in Fig. 1) form convenient and independent color adjustment for these three colors. These controls can be brought out the front panel of the receiver, and it is merely necessary to set them for white on a monochrome signal to obtain accurate and correct color adjustment for a subsequent color signal. The color phase is simply adjustable merely by adjusting resistors 72 and 75 in network 64 (network 210 in Fig. 1) and resistor 103 for the reference signal, these adjustments providing a convenient control on the hues of the various colors to follow transmitter drift or other variations.

The invention provides, therefore, an improved color television receiver that is simple in its construction in that it utilizes relatively few discharge devices and component parts. Moreover, the receiver is highly stable in its operation, and may be adjusted simply and expeditiously and by means of relatively few independent controls.

I claim:

1. A color television receiver for utilizing a color television signal which includes a luminance component and which further includes a chrominance subcarrier, said subcarrier having a selected frequency and having a plurality of different color components modulated thereon with selected phase relations with respect to one another, said receiver including in combination, a detector unit for demodulating a received color television signal to recover said luminance component and said chrominance subcarrier, a chrominance channel coupled to said detector for selecting and translating the chrominance subcarrier, three chroma demodulators included in said chrominance channel, means for impressing a reference signal on said three chroma demodulators having the frequency of the chrominance subcarrier and having a selected phase relation with the color components modulated thereon, circuit means for impressing said chrominance subcarrier directly on one of said demodulators to recover one of the color components, a resistance-capacity phase-shifting network for impressing said chrominance subcarrier on the second and third of said demodulators with respective selected phase relations with said reference signal to recover a second and a third of said color components, three adjustable resistance matrixing networks for combining said three recovered color components respectively with the luminance component of the color television signal to derive three distinct chroma signals, a color image reproducer, and amplifying means for supplying said chroma signals to said reproducer.

2. A color television receiver such as defined in claim 1 in which said phase shifting network includes a balanced input circuit, first resistor means and first capacitor means series-connected across said input circuit, second resistor means and second capacitor means series-connected across said input circuit, first circuit means connected to the common junction of said first capacitor and first resistor means for impressing said chrominance subcarrier on said second demodulator, and second circuit means connected to the common junction of said second capacitor and second resistor means for impressing said chrominance subcarrier on said third demodulator.

3. A color television receiver such as defined in claim 1 in which said phase shifting network includes a balanced input circuit having a bifilar winding shunted by capacitor means to form a resonant circuit tuned to the frequency of the chrominance subcarrier, said bifilar winding being shunted by resistor means and an intermediate point on said bifilar winding and on said last-named resistor means being connected to a point of reference potential, first variable resistor means and first capacitor means series-connected in the recited order across said input circuit, second capacitor means and second variable resistor means series-connected in the recited order across said input circuit, first circuit means connected to the common junction of said first capacitor and first resistor means for impressing said chrominance subcarrier on said second demodulator, and second circuit means connected to the common junction of said second capacitor and second resistor means for impressing said chrominance subcarrier on said third demodulator.

4. In a color television receiver for utilizing a color television signal which includes a chrominance subcarrier, said subcarrier having a selected frequency and having a plurality of different color components modulated thereon with a selected phase relation with respect to one another, which receiver includes, a detector circuit for demodulating a received color television signal, a chrominance channel coupled to said detector for selecting and translating the chrominance subcarrier component of the received color television signal, a plurality of chroma demodulators included in said chrominance channel, and means for impressing a reference signal on said chroma demodulators having the frequency of the chrominance subcarrier; a phase shifting network for impressing said chrominance subcarrier respectively on two of said chroma demodulators with respective phase relations with respect to said reference signal to recover a second and third of said color components, and phase shifting network including first resistor means and first capacitor means series-connected with one another, and said network further including series-connected second resistor means and second capacitor means connected across said first resistor and capacitor means, a first connection extending from the common junction of said first capacitor and resistor means to one of said chroma demodulators, and a second connection extending from the common junction of said second capacitor and resistor means to a second of said chroma demodulators.

5. In a color television receiver for utilizing a color television signal which includes a chrominance subcarrier, said subcarrier having a selected frequency and having a plurality of different color components modulated thereon with a selected phase relation with respect to one another, which receiver includes, a detector circuit for demodulating a received color television signal, a chrominance channel coupled to said detector for selecting and translating the chrominance subcarrier, a plurality of chroma demodulators included in said chrominance channel, and means for impressing a reference signal on said chroma demodulators having the frequency of the chrominance subcarrier; a phase shifting network for impressing said chrominance subcarrier respectively on two of said chroma demodulators with respective phase relations with respect to said reference signal to recover a second and third of said color components; said phase shifting network including a balanced input circuit, first adjustable resistor means and first capacitor means series-connected in the recited order across said input circuit, and second adjustable capacitor means and second resistor means series-connected in the recited order across said input circuit; a first connection extending from the common junction of said first capacitor and resistor means to one of said chroma demodulators, and a second connection extending from the common junction of said second capacitor and resistor means to a second of said chroma demodulators.

6. A color television receiver for utilizing a color television signal which includes a chrominance subcarrier, said subcarrier having a selected frequency and having a plurality of different color components modulated thereon with a selected phase relation with respect to one another, said receiver including in combination, a detector circuit for demodulating the received color television signal; a chrominance channel coupled to said detector for selecting and translating the chrominance subcarrier; a plurality of chroma demodulators included in said chrominance channel; means including an amplitude limiter for impressing a reference signal having the frequency of the chrominance subcarrier on said chroma demodulators; a phase-shifting network for impressing said chrominance subcarrier respectively on two of said chroma demodulators respectively leading and lagging said reference signal by respective predetermined phases; said phase-shifting network including a balanced input circuit, first resistor means and first capacitor means series-connected in the recited order across said input circuit, and second capacitor means and second resistor means series-connected in the recited order across said input circuit; a first connection extending from the common junction of said first capacitor and first resistor means to one of said chroma demodualtors, and a second connection extending from the common junction of said second capacitor and second resistor means to a second of said chroma demodulators.

7. The television receiver recited in claim 6 in which said amplitude limiter comprises an electron discharge device, including a screen electrode and an anode, and circuit means for supplying a relatively low D.C. exciting potential to said screen and to said anode to cause said device to function as an instantaneous top and bottom amplitude limiter.

8. The combination of claim 7 in which said limiter discharge device further includes a control grid and a cathode, and circuit means for maintaining said control grid negative with respect to said cathode in the presence of a signal applied to said grid.

9. The television receiver recited in claim 6 in which said amplitude limiter comprises a diode for amplitude limiting one peak only of each cycle of the reference signal.

10. A color television receiver for utilizing a color television signal which includes a chroma subcarrier having a selected frequency and including a plurality of different color modulation components with selected phase relations relative to one another, said receiver including in combination, a chrominance channel for selecting and translating the chroma subcarrier of a received color television signal, a plurality of chroma demodulators included in said chrominance channel, means for impression a reference signal on said chroma demodulators having the frequency of the chroma subcarrier, and phase shifting means for impressing said chroma subcarrier on said chroma demodulators with selected phase relations relative to said reference signal such that individual color modulation components are derived from said chroma subcarrier by said demodulators, said phase shifting means including a winding having an intermediate point connected to a reference potential, capacitor means shunted across said winding to form therewith a balanced resonant input circuit tuned to the frequency of the chroma subcarrier, resistor means shunting said winding and having an intermediate point connected to the reference potential, series connected variable resistor means and second capacitor means shunted across said winding, and circuit means connected to the common junction of said variable resistor means and said second capacitor means and to one of said chroma demodulators for applying said chroma subcarrier thereto with a phase such that said one demodulator produces a signal representing a particular color component.

References Cited in the file of this patent

UNITED STATES PATENTS

| | | |
|---|---|---|
| 2,648,722 | Bradley | Aug. 11, 1953 |
| 2,715,153 | Sziklai | Aug. 9, 1955 |

FOREIGN PATENTS

| | | |
|---|---|---|
| 726,030 | Great Britain | Mar. 16, 1955 |